United States Patent [19]

Mitchell

[11] 4,017,167
[45] Apr. 12, 1977

[54] INTERMITTENT MOVEMENT WITH TANDEM CAMS

[76] Inventor: George A. Mitchell, 687 Prospect Crescent, Pasadena, Calif. 91103

[22] Filed: Mar. 5, 1976

[21] Appl. No.: 664,155

[52] U.S. Cl. ............................... 352/194; 226/62; 226/67

[51] Int. Cl.² ......................................... G03B 1/22

[58] Field of Search ............... 352/194; 226/62, 67, 226/68, 69, 70, 71, 72, 73

[56] References Cited

UNITED STATES PATENTS 2,144,277  1/1939  Wall ................................... 226/73

FOREIGN PATENTS OR APPLICATIONS 669,109  11/1936  Germany ........................... 352/194

*Primary Examiner*—Monroe H. Hayes

[57] ABSTRACT

In the present cam-driven intermittent movement for motion picture machines the pull-down action is shared by a plurality of cams mounted on a common shaft and operating in tandem, thereby reducing the noise and vibration and/or permitting faster pulldown. One cam drives a claw arm in its swinging movement about a pivot, while the other cam drives a carrier arm which is pivoted at one end on the machine frame and carries at its other end the claw arm pivot. Meshing action of the claw may be controlled by cam action applied to either arm. Such action may be derived from the same cam as the pull-down action, or may employ an auxiliary meshing cam.

3 Claims, 9 Drawing Figures

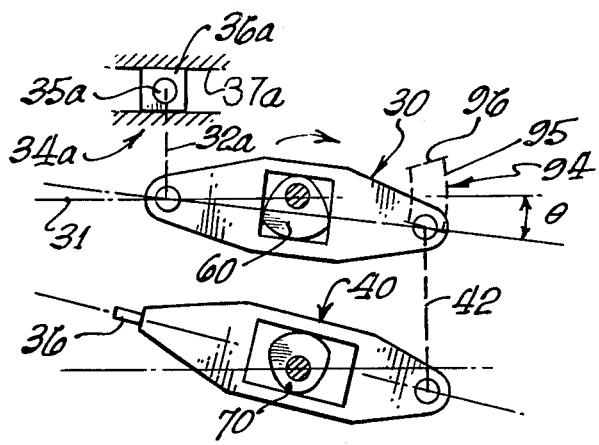
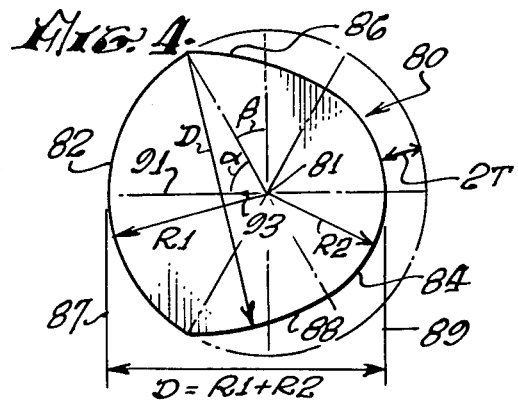
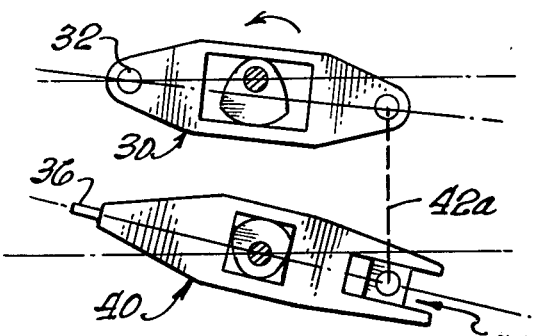
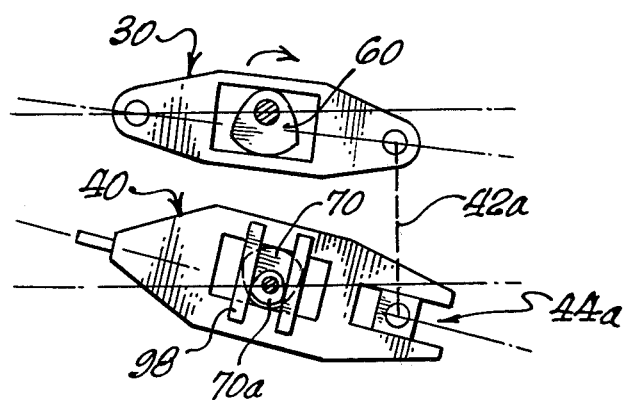
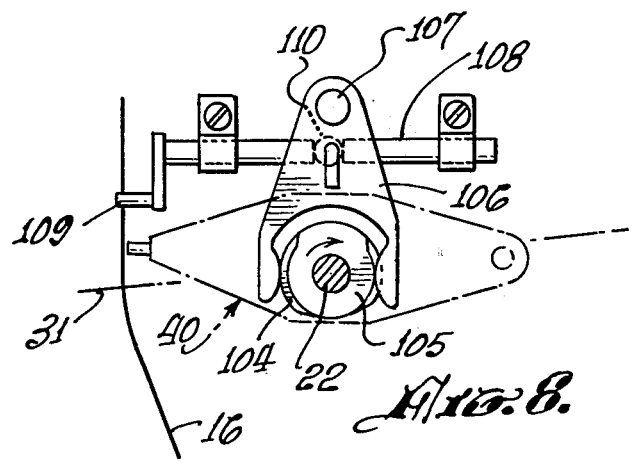

INTERMITTENT MOVEMENT WITH TANDEM CAMS

BACKGROUND OF THE INVENTION

This invention concerns mechanisms for intermittently advancing a motion picture film along a film guide past the film aperture of a motion picture machine.

The invention relates primarily to intermittent movements for use in motion picture cameras, and will be so described for the sake of clarity. However, many aspects of the invention are useful in other types of motion picture machines, such as projectors, printers and the like.

The invention has to do more particularly with cam-driven intermittent movements in which a claw arm is driven in oscillation about a pivot axis and carries a claw structure in a definite closed path. That path includes a pull-down stroke generally parallel to the film guide with the claw engaging and driving the film, and a return stroke with the claw released from the film.

In some movements of that general type the meshing action by which the claw alternately engages and releases the film may be produced by ratchet action of the claw structure itself. However, it is generally preferred that the cam-driven movement of the claw arm includes path segments transverse of the film for positively inserting the claw in a film perforation prior to the pull-down stroke and for retracting the claw after completion of that stroke. Such meshing segments of the claw path are preferably clearly distinct from the film driving strokes in order to minimize sawing action of the claw on the perforation edge.

Such intermittent movements commonly use one or more self-conjugate cams, which have constant diameter and can thus work positively between pairs of parallel opposed cam followers mounted on the claw arm. Such cams have the great advantage that they can be designed to produce relatively rapid to and fro movements which are separated by dwell periods. For example, each stroke may occupy only 90° of cam rotation relative to the cam followers. The drive strokes then alternate with 90° dwell periods.

A single cam of that type with dwell periods of at least 90° may cooperate with one pair of cam followers to drive the swinging movement of the claw arm about its pivot, producing the film driving claw strokes, and may also cooperate with a second pair of cam followers perpendicular to the first to drive the claw arm in longitudinal translational movement, producing the meshing action of the claw. Alternatively, two cams may be mounted on a common shaft, engaging respective pairs of suitably oriented cam followers. In either case, the cam rest periods permit the claw arm movements in one dimension to occur largely or wholly during the dwell periods of its movements in the other dimension. Hence the driving segments and the meshing segments of the claw movement are essentially distinct, producing typically a generally rectangular claw path.

With suitable cam design, the dwell periods can be extended beyond 90°, typically to as much as 120°, with corresponding shortening of the stroke periods and speeding up of the driven movements. That has the great advantage of reducing the fraction of each cycle that is occupied by the film movement, correspondingly extending the time available for exposing the film at the film aperture.

However, for a given cam throw, such extension of the dwell periods beyond 90° is obtained at the cost of increased cam diameter. Extension of the film exposure time is therefore limited in practice by design problems of accommodating the larger cam size and by the tendency of the larger cam to produce more noise and vibration.

A primary object of the present invention is to reduce the inherent noise and vibration produced by cam-driven intermittent movements, especially those providing rapid pull-down.

The invention further permits the design of fully practical intermittent movements which retain the known advantages of self-conjugate cam drive and yet provide more rapid pull-down than has previously been feasible.

The invention further provides great flexibility of detailed design of cam-driven movements, especially with respect to the proportions and time relations of the claw path.

At the same time, the invention maintains the excellent reliability and virtually the full economy of construction for which conventional cam-driven movements are well known.

SUMMARY OF THE INVENTION

Those and other objects of the invention are attained by sharing the pull-down drive between a plurality of cams which are mounted on a common cam shaft and act in tandem. Each cam then produces only a fraction of the entire pull-down movement of the claw, correspondingly reducing the throw that must be produced by each cam. Hence, for a given speed of pull-down, the physical size of each cam is sharply reduced, lessening the total noise produced by the movement and typically permitting more compact design.

Moreover, in preferred form of the invention, the pull-down action is shared between two cams in such a way that there is at least partial balancing of the inertial forces within the movement, reducing the inherent vibration produced by the movement, with corresponding reduction of noise.

In preferred form of the invention, the film advancing claw is mounted at one end of a claw arm, which may be basically conventional in design, being pivotally supported at its other end and driven by a primary cam of constant width type. That primary cam typically works between mutually opposed cam followers intermediate and generally parallel to the length of the claw arm. However, the cam need produce only approximately half the throw required in a conventional movement.

The pivot structure supporting the claw arm of the invention is mounted on a carrier member. That member, in turn, is movably mounted on the machine frame and is driven cyclically by auxiliary cam means mounted on the same shaft as the primary cam. The carrier member may have a wide variety of forms, but typically and preferably comprises an elongated arm carrying the claw arm pivot at one end and pivotally mounted at the other end on the machine frame. Mutually opposed cam followers on the carrier member intermediate its length engage an auxiliary cam of self-conjugate type fixedly mounted on the shaft.

In that illustrative form of the invention, the primary and auxiliary cams are mounted on the shaft in approximately mutually opposite phase relation. During the claw movement in one direction along the film path, movement of the carrier member shifts the claw arm pivot generally parallel to the film path in the other direction. That pivot movement increases the angular swing of the claw arm, correspondingly increasing the stroke of its carried claw.

The invention permits a wide selection of structures for controlling the meshing action of the claw. Whereas a simple ratchet claw may be used, it is generally preferred to provide positive meshing action. For that purpose, one of the described pivot structures is designed to permit translational movement of the supported member parallel to its length. That longitudinal movement of the supported member may be driven by the same constant width cam that drives its swinging movement, or may be driven by an additional meshing cam mounted on the same shaft. In either case, mutually opposed cam followers are mounted in transverse position on the member for controlling the meshing movement.

When the freedom for longitudinal meshing movement is provided at the pivot that supports the carrier member on the frame, the cam drive for the meshing action may act either on the carrier member or directly on the claw arm. Moreover, whichever pivot provides the sliding action, it may be designed either so that its pivot axis moves in translation with the supported member, or so that it remains fixed relative to the support. Those various structures are all basically similar in their action. However, the resulting claw paths differ in respects that are sometimes significant, especially in the relative timing of individual strokes and in the detailed shape of the meshing sections of the claw path.

THE PRIOR ART

In many early movements the claw arm was driven by a simple eccentric, which is inherently quieter and less subject to wear than a cam. However, since an eccentric moves the driven member in a circular path, that circular movement must be transformed into at least an approximation of linear movement at the claw itself. Many different linkage systems have been developed for that purpose. U.S. Pat. No. 1,930,723, which was issued to the present applicant in 1933, described such a system in which the claw arm is driven with the aid of an auxiliary or driving arm, pivotally mounted at one end between the eccentric shaft and the film aperture. The claw arm is pivoted on the other end of the driving arm, and is slidingly guided at the eccentric shaft. As described in the patent, a secondary eccentric of relatively small throw acts on the slide of the claw arm in order to improve the detailed shape of the claw path where the claw enters a film perforation. Thus, the mechanism described in that Mitchell patent does not suggest any way of quieting a cam-driven movement, and does not suggest how to facilitate use of a cam form that would provide maximum speed of the pull-down stroke.

U.S. Pat. No. 2,288,028, issued to George H. Worrall in 1942 and assigned to Mitchell Camera Corporation, employs a single self-conjugate cam, which may be considered to be substituted for the primry eccentric of the Mitchell movement just described. That cam operates in a follower structure of box form, driving both the meshing and pull-down movements. Worrall points out that this structure permits cam rotation in the direction to give maximum speed of pull-down. The patent suggests no possibility of dividing the drive between two cams acting in tandem.

U.S. Pat. No. 3,587,960 to Joachim Gerb is concerned primarily with providing separately driven claw arms for engaging the perforation rows on opposite edges of a film. Rather incidentally, he drives each claw arm by means of two cams which are mounted on separate parallel shafts geared together to rotate at equal speed in the same direction. Although those cams might be said to divide the driving function between them, the division is unequal since only the cam at the center of the claw arm acts with any mechanical advantage in producing swinging movement of the claw. Moreover, Gerb's cams have a throw angle of only 90°, and he says nothing about the use of faster cams.

BRIEF DESCRIPTION OF THE DRAWING

A full understanding of the invention, and of its further objects and advantages, will be had from the following description of certain preferred manners of carrying it out, which description is to be read with reference to the accompanying drawings. The particulars of that description and of the drawings are intended only as illustration and not as a limitation on the scope of the invention.

In the drawings:

FIG. 4 is a schematic plan of a typical constant diameter cam;

FIG. 5 is a schematic drawing representing an illustrative modification of the pivot structure of FIG. 1;

FIG. 6 is a schematic drawing representing an illustrative modification of the meshing drive of FIG. 1;

FIG. 7 is a schematic drawing representing a further illustrative modification of the meshing drive;

FIG. 8 is a schematic drawing representing an illustrative manner of driving registration pins.

In FIGS. 1 to 3 the frame of a motion picture camera is schematically represented by the normally vertical side wall 10, which carries the aperture plate 12. The exposure aperture 14 in plate 12 is shown only partially in FIG. 1. Spaced back of the aperture plate is a vertical wall 15, forming with the aperture plate a guideway for the film 16. Clearance slots in wall 15 and aperture plate 12 provide access to the film for the claw 36, carried at the forward end of the claw arm 40. For clarity of illustration only a single claw is shown. In practice, however, the claw arm may carry two or more claws spaced longitudinally of the film at the perforation interval, or may carry a transverse yoke with laterally spaced claws for engaging perforations along both film edges.

Figure 1:
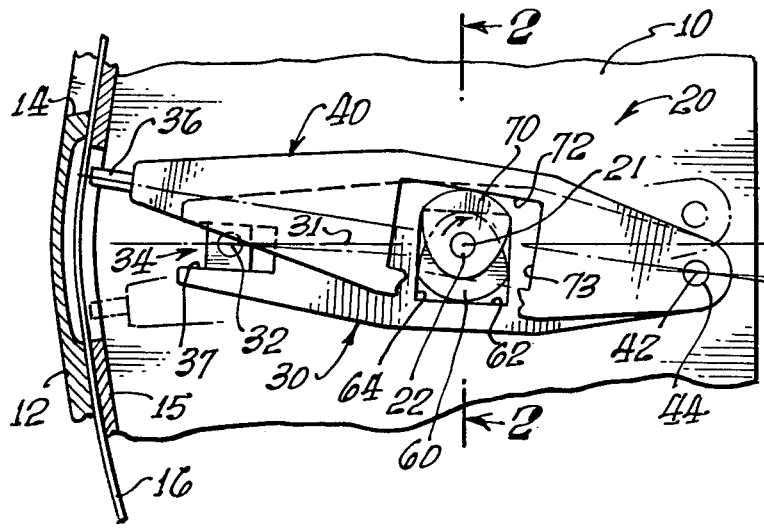
FIG. 1 is an elevation representing schematically an illustrative embodiment of the invention.
Figure 2:
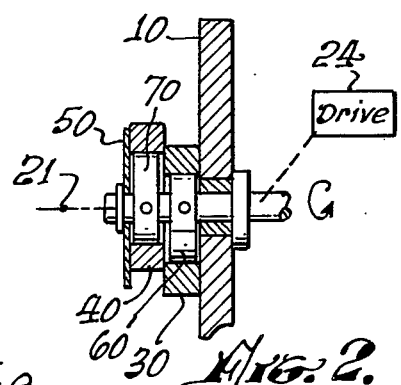
FIG. 2 is a section on the line 2—2 of FIG. 1.
Figure 3:
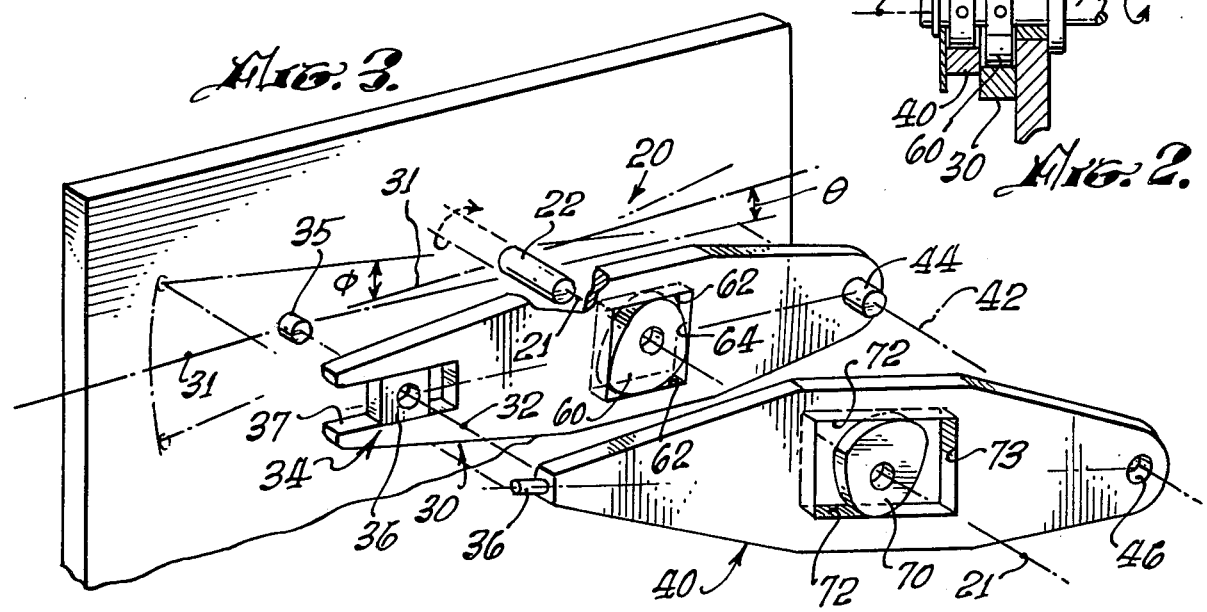
FIG. 3 is a schematic exploded perspective generally corresponding to FIG. 1.

The intermittent movement 20 is driven by the shaft 22, which is journaled on frame plate 10 and is continuously driven by conventional means indicated schematically at 24 in FIG. 2. The direction of shaft rotation in the present embodiment is clockwise as seen in FIGS. 1 and 3. The intermittent mechanism proper comprises the carrier arm 30 and the claw arm 40, both of which are typically formed as stampings from sheet material with some or all of their working surfaces machined in suitable manner. Carrier arm 30 and claw arm 40 are typically confined in any suitable manner to movement in respective planes parallel to frame plate 10. As shown, carrier arm 30 is guided on one side by sliding contact with the face of plate 10, and on the other side by the flat face of claw arm 40. The claw arm, in turn, is guided on its inner side by the carrier arm, and on its outer face by the retaining washer 50, which is mounted on shaft 20 as indicated in FIG. 2. Washer 50 is omitted in the other figures for clarity of illustration.

In the present illustrative embodiment, carrier arm 30 is mounted at its forward end with respect to frame plate 10 for pivotal movement with respect to the pivot axis 32. The pivot structure 34 further permits sliding movement of the arm parallel to its length. As typically shown, pivot structure 34 comprises the pivot pin 35, fixedly mounted in plate 10, and the pivot block 36, which is rotatably mounted on pin 35 and is slidingly received in the longitudinal slot 37 formed at the forward end of arm 30. Pivot axis 32 is thus fixed with respect to the machine frame.

The rearward ends of the two arms 30 and 40 are coupled together for relative pivotal movement with respect to the pivot axis 42, typically by the pivot pin 44 which is fixedly mounted in arm 30 and is fittingly received in the bore 46 in arm 40.

Carrier arm 30 and claw arm 40 are driven in their pivotal movements by the respective cams 60 and 70, fixedly mounted on shaft 22. Those cams are typically of the known self-conjugate type more clearly illustrated in FIG. 4 and more fully described below. The two cams are preferably generally similar in size, form and in the throw that they produce. Although they may differ in some or all of those respects to a limited extent as desired, they may be identical, and are so shown for clarity of illustration. The cams are mounted on shaft 22 in at least approximately opposite phase relation. The axis 21 of shaft 22 and pivot axis 32 define the mid-plane 31 of the movement.

A typical self-conjugate cam 80 is represented in FIG. 4. The two opposite dwell surfaces 82 and 84 are concentric at the cam axis 81 and have respective larger and smaller radii R1 and R2. It is convenient to denote the equal dwell angles of those two surfaces in terms of their half-value. That angle is shown as $\alpha$, and is taken as 60° for illustration. The two throw surfaces 86 and 88 alternate with the dwell surfaces, and subtend equal throw angles at axis 81, which are denoted in terms of their half angles $\beta$, such that $$\alpha + \beta = 90° \qquad (1)$$

Each of the throw surfaces is circular, with its center at the intersection of the opposite throw surface and the dwell surface of larger radius. The throw surfaces lead tangentially into the dwell surface of smaller radius, from which it follows that the common radius D of the throw surfaces is $$D = R1 + R2 \qquad (2)$$

That radius D is also the width of the cam and equals the separation of each pair of opposite follower surfaces, typically represented by the lines 87 and 89 in FIG. 4. The line joining the contact points of the followers, such as line 91, passes through axis 81 during the dwell periods. The mid-point 93 of that line is then spaced from cam axis 81 by the distance T, which is half of the total throw of the cam and is given by $$T = (R1 - R2)/2 \qquad (3)$$

The relationship between the cam width D, the half-throw T and the half-angles $\alpha$ and $\beta$ of the rest and throw periods can be expressed as $$D = 2\ R1\ \sin\alpha = 2\ R1\ \cos\beta \qquad (4)$$

and $$T = R1\ (1 - \sin\alpha) = R1\ (1 - \cos\beta) \qquad (5)$$

Cam 70 works between the two parallel opposed cam follower surfaces 72, which are parallel to the length of claw arm 40 and thus control the arm's swinging movement about pivot axis 42. Follower surfaces 72 typically comprise opposite sides of a rectangular aperture which is formed in the body of the claw arm and is long enough to provide ample clearance between its ends 73 and the cam.

Cam 60 similarly engages the two longitudinal follower surfaces 62 on carrier arm 30 for driving the swinging movement of that arm. However, carrier arm 30 is also provided with the two transverse follower surfaces 64, which typically form with longitudinal surfaces 62 a square aperture or "box" in the body of the arm. The single boxed cam 60 thus drives both the swinging movement and the longitudinal translational movement of arm 30 with respect to sliding pivot structure 34. It is generally preferred that all the follower surfaces be plane. However, as typically described in U.S. Pat. Nos. 2,618,196 and 2,660,918, curved follower surfaces may sometimes produce useful special effects, and may be employed if desired.

The mechanism is shown in FIGS. 1 to 3 at approximately the midpoint of the meshing stroke, with claw 36 about to enter a perforation of film 16 in response to the clockwise rotation of cam 60, acting on transverse followers 64. That action directly shifts carrier arm 30 toward the film, and that movement is transmitted via pivot 44 to the claw arm, which is free to move parallel to its length relative to cam 70. At that stage of the cycle, both cams 60 and 70 are at dwell periods with respect to the longitudinal followers 62 and 72, with carrier arm 30 at the lower extreme of its swinging movement, and claw arm 40 at the upper extreme of its range. The angular deflection of arm 30 with respect to its mid-range position is indicated as the angle $\theta$, that of claw arm 40 by the angle $\phi$.

Those arm deflections alter the angular relations between the cams and their respective follower surfaces. A generally corresponding effect is well known in conventional single-arm movements. However, the present movement has the useful property that the timing of the cam action is displaced in the same direction for both the arms. In the present illustrative embodiment, after completion of the meshing stroke, cam 60 will reach the start of its pull-down stroke later by an angle $\theta$ than it would if arm 30 were not deflected. During its pull-down stroke carrier arm 30 moves generally upward, swinging counterclockwise about its pivot axis 32. The arm deflection is thereby changed from $\theta$ on one side of mid-position to $\theta$ on the other side. That change of arm deflection causes the pull-down stroke to terminate earlier than it would otherwise do, again by an angle of $\theta$. Similarly, claw arm 40 begins its pull-down stroke later by an angle $\phi$ than it would if undeflected, and terminates that stroke earlier by the same angle. Both those effects shorten the duration of the pull-down stroke, one by $2\theta$, the other by $2\phi$.

Figure 9:
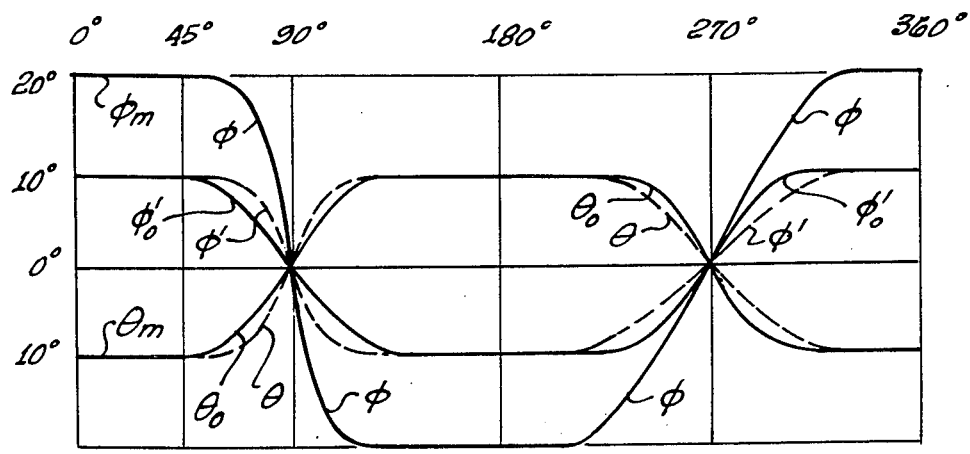
FIG. 9 is a schematic graph illustrating certain time relationships involved in the invention.

It is highly advantageous that both strokes are thus accelerated, since the pull-down time is thereby shortened for any given cam design. The shortened pull-down stroke is balanced by a corresponding extension of the duration of the return stroke. However, since the claw has then been retracted from the film, the duration of the return stroke is of relatively little practical importance. graphical form in FIG. 9, which shows arm deflection plotted against cam shaft angle. Zero angle corresponds to the midpoint of the meshing stroke, as in FIGS. 1 and 3. Both $\theta$ and $\phi$ are then at their maximum clockwise values $\theta_m$ and $\phi_m$, which are considered positive algebraically. However, to separate the angles on the graph, positive values of $\theta$ are plotted downward. For clarity of illustration, the graph is based on cams having equal dwell and throw periods ($\alpha = \beta = 45°$), rather than the generally preferred angles approximating $\alpha = 60°$, $\beta = 30°$, as in FIG. 4. Also for clarity of illustration, the maximum angular deflections $\theta_m$ and $\phi_m$ of the arms from mid-positions are assumed to have the abnormally large values of 10° and 20°, respectively. The curves $\theta_0$ and $\phi_0$ represent the arm deflections that would result from the carrier cam and claw arm if the claw arm pivot were stationary and if the timing modifications due to the actual arm deflections are neglected. The curves $\theta$ and $\phi'$ represent the deflections with those timing modifications included, but still assuming the claw arm pivot stationary. Curve $\phi$ represents the actual claw arm deflection, based on the approximation that $\theta = \phi' + \theta$.

Since the actual deflections of the two arms are unequal, with $\phi$ approximately equal to $2\theta$, the shortening of the pull-down period of the claw arm cam due to claw arm deflection is correspondingly approximately twice the shortening of the pull-down period of the carrier arm cam due to carrier deflection. That difference can be avoided, and the effective speed of the movement slightly increased, by designing carrier arm cam 60 with an inherently faster action, that is, with its angle $\beta$ smaller than that of claw arm cam 70, by substantially the angle $\phi_m - \theta_m$. That difference between the two cams can be obtained in any desired manner. If it is preferred to keep the cam diameters equal, their throws are necessarily different, which divides the pull-down action between the two cams in a slightly different manner. On the other hand, if it is preferred that the cam throws be equal, the diameter of the carrier arm cam can be made larger than that of the claw arm cam. Alternatively, the cams can differ slightly in both diameter and throw.

FIG. 5 illustrates schemtically a modified embodiment in which carrier arm 30 is pivotally mounted on frame plate 10 in a manner which permits the pivot axis 32a to move along mid-plane 31 with the meshing movement of the arm. As shown, the pivot block 36a is slidably mounted on the frame plate by guide means 37a and carries the pivot pin 35a. With that illustrative structure, the path of movement of pivot axis 42, by which the two arms 30 and 40 are coupled together, is slightly modified. As schematically shown at 94, that path is generally rectangular with generally vertical and slightly arcuate sides 95 and with upper and lower ends 96 which are appreciably inclined toward each other in a forward direction. That inclination exceeds the angle $\theta$, due to the shift of pivot axis 32a along guideway 37a. Since the rearward end of claw arm 40 is carried along that same path, the inclination of path segments 96 causes the meshing stroke of claw 36 to be more nearly horizontal than in the structure of FIGS. 1 and 3.

FIG. 6 represents a further modification, in which the meshing action of the claw arm is driven directly by the same cam that controls its pull-down action, rather than indirectly by the carrier arm cam. Thus, claw arm cam 70 operates in a box, while carrier arm cam 60 has only longitudinal followers. With that arrangement longitudinal sliding movement can be accommodated by slide structure at either carrier pivot axis 32 or coupling pivot axis 42. The structure shown, which provides sliding movement of coupling axis 42a relative to claw arm 40, besides requiring only the claw arm to partake of the meshing action, has the property that the meshing movement of claw 36 acts strictly parallel to the axis of the claw arm. However, to obtain meshing action by a boxed cam on the claw arm it is necessary to drive the cam shaft in the same direction as the swinging movement of the claw arm during pull-down, that is, counterclockwise as shown in FIG. 6. Hence the above described acceleration of the pull-down stroke is not available.

FIG. 7 represents a further embodiment, in which the meshing movement of the claw arm is accommodated by the same slide structure 44a at coupling pivot axis 42a as in FIG. 6. However, the meshing action is driven by an auxiliary cam 70a. That cam acts on auxiliary follower surfaces, which typically comprise the two parallel transverse bars 98, fixedly mounted on the outer face of the claw arm. With such structure, meshing cam 70a may be mounted in opposite phase to claw arm cam 70. It is then feasible to drive the cam shaft clockwise, as shown, providing the timing properties already described in connection with FIGS. 1 and 3. Moreover, the throw of meshing cam 70a can be selected independently of the main claw arm cam, providing greater freedom of design with respect to both the timing and the length of the meshing strokes. Since the meshing action normally requires relatively little movement, and since ample time for that movement is normally available, the auxiliary cam can ordinarily be designed to add only negligibly to the noise of the movement. Thus, the described reduction of noise and vibration obtainable by tandem action of the main cams is still available.

Intermittent movements designed in accordance with the present invention can readily be provided with registration means for positively defining the position of the film in its guideway during the period between pull-down strokes. Such means can be constructed and driven in any suitable manner. FIG. 8 illustrates a preferred registration mechanism which utilizes two mutually complementary cams 104 and 105 on shaft 22 engaging opposite arms of a yoke 106 which is pivoted at 107. Yoke 106 is coupled to the sliding member 108 which carries the registration pins 109 at its forward end. Claw arm 40 is indicated schematically in dot-dash lines for reference, carrier arm 30 being omitted for clarity of illustration. The coupling between yoke 106 and member 108 is adjustable in any suitable manner, as by rotation of the eccentric indicated at 110, to permit withdrawal of pins 109 from the film for threading. The illustrated type of cam drive permits great flexibility in the timing of the registration pin movement, and can therefore provide fully positive film definition despite the extremely rapid film pull-down which the present invention makes possible.

Those skilled in the art will recognize, from the illustrative embodiments that have been explicitly described, that many further modifications are available without departing from the proper scope of the invention.

I claim:

1. In a film intermittent movement the combination of a frame providing a film guideway, a driven shaft journaled in the frame rearwardly of the guideway first and second cams each of constant diameter mounted on the shaft in approximately opposite phase relation, a carrier arm, means for mounting the carrier arm at its forward end for oscillatory swinging movement with respect to a first pivot axis and for longitudinal translational movement with respect to the frame, cam follower means on the carrier arm intermediate its length and engaging one of said cams for driving the carrier arm in its said swinging and translational movements, a claw arm having claw means at its forward end for engaging a film in the guideway, means pivoting the claw arm at its rearward end on the carrier arm on a second pivot axis which is fixed with respect to the claw arm and the carrier arm, cam follower means on the claw arm intermediate its length and engaging the other of said cams for driving the claw arm in oscillatory swinging movement about said second pivot axis while permitting free longitudinal translational movement of the claw arm due to said movement of the carrier arm, said translational movement of the carrier arm causing said claw means to engage the film substantially throughout the swings of said arms opposite to the direction of drive of the shaft.

2. Combination according to claim 1 wherein said first pivot axis is fixed with respect to said carrier arm and is movable relative to the frame in a direction generally radial with respect to said shaft.

3. Combination according to claim 1 wherein said first cam has a throw angle that is less than the throw angle of said other cam by approximately the total angular excursion of said claw arm minus the total angular excursion of said carrier arm.

* * * * *